United States Patent
Yoda et al.

[11] Patent Number: 6,089,056
[45] Date of Patent: Jul. 18, 2000

[54] STRUCTURE FOR MOUNTING A METALLIC PIN INTO A RESIN PART

[75] Inventors: Yuji Yoda; Mikio Ichinose, both of Yamanashi-ken, Japan

[73] Assignee: Mitsui Kinzoku Kogyo Kabushiki Kaisha, Tokyo, Japan

[21] Appl. No.: 09/103,550

[22] Filed: Jun. 24, 1998

[30] Foreign Application Priority Data

Jun. 25, 1997 [JP] Japan ................................. 9-184334
Jun. 25, 1997 [JP] Japan ................................. 9-184336

[51] Int. Cl.$^7$ ................................................ B60R 25/02
[52] U.S. Cl. ................................. 70/208; 292/DIG. 53; 292/DIG. 29; 411/176
[58] Field of Search .................... 292/DIG. 30, DIG. 31, 292/DIG. 53, DIG. 29; 411/180, 176; 70/208

[56] References Cited

U.S. PATENT DOCUMENTS

| | | | |
|---|---|---|---|
| 2,347,219 | 4/1944 | Schnell | 411/180 |
| 4,358,450 | 11/1982 | Nash | 296/50 |
| 4,892,342 | 1/1990 | Newman et al. | 292/347 |
| 5,035,453 | 7/1991 | Fukumoto et al. | 292/336.3 |
| 5,046,340 | 9/1991 | Weinerman et al. | 70/208 |
| 5,391,031 | 2/1995 | Medal | 411/82 |
| 5,451,089 | 9/1995 | Bender | 296/57.1 |
| 5,558,372 | 9/1996 | Kapes et al. | 292/336.3 |

*Primary Examiner*—B. Dayoan
*Assistant Examiner*—John B. Walsh
*Attorney, Agent, or Firm*—Browdy and Neimark, PLLC

[57] ABSTRACT

A mounting apparatus comprises a resin part, an attaching hole formed in the resin part, a metallic pin having an anchor inserted into the attaching hole and an exposure portion. Both sides of the attaching hole are opened to an outside of the resin part. The anchor penetrates the resin part through the attaching hole, and a tip end of the anchor is in the outside of the resin part. The exposure portion has a first supporting portion continued with the anchor, a second supporting portion, a flange located between the first and second supporting portions, and a projection continued with the second supporting portion. First and second levers are rotatably fitted on the first and second supporting portions, respectively. A base seat makes a contact with the tip end of the anchor when the anchor is inserted into the attaching hole.

10 Claims, 6 Drawing Sheets

STRUCTURE FOR MOUNTING A METALLIC PIN INTO A RESIN PART

BACKGROUND OF THE INVENTION

1. Field of the Invention

The present invention relates to a structure for mounting a metallic pin into a resin part, and particularly relates to a mounting structure used to assemble a handle assembly for a tailgate of an automobile of a pickup type.

2. Description of the Related Art

FIGS. 1 and 2 show a conventional arrangement for mounting a metallic pin into a resin part. The metallic pin A is constructed by an anchor B which is inserted into a sleeve-shaped attaching hole or recess C of a resin part D, a projection E to which a lever or a plate F is attached, and a flange G which is formed between the anchor B and the projection E. An outer circumference of the anchor B is preferably knurled. A diameter of the anchor B is slightly longer than that of the attaching hole C. The anchor B is inserted into the attaching hole C until the flange G comes into contact with the resin part D while the anchor B is heated by using supersonic waves, etc. Thereafter, the lever F is attached to the projection E. A head H is formed at a tip end of the projection E by caulking processing, etc.

A problem of the conventional arrangement exists in that no accuracy of an inserting position of the metallic pin A can be increased. A main cause for this problem is that the metallic pin A is often pushed back by the air within the attaching hole C compressed by inserting the anchor B. An additional cause for this problem is that a portion near an inlet of the attaching hole C is melted and deformed in contact with the heated flange G in a certain case.

Another problem of the conventional arrangement also exists in that it is difficult to form the head H at the tip end of the projection E. There is a case in which the resin part D is crushed by external force for forming the head H.

SUMMARY OF THE INVENTION

Accordingly, an object of the present invention is to provide a mounting structure in which no air within an attaching hole is compressed when a metallic pin is inserted into the attaching hole.

Another object of the present invention is to provide a mounting structure in which no inlet portion of the attaching hole is melted by the heated metallic pin.

Another object of the present invention is to provide a mounting structure capable of easily forming a head in an end portion of the metallic pin.

Another object of the present invention is to provide a handle assembly for a tailgate of an automobile of a pickup type assembled by using the above-mentioned mounting structure.

DETAILED DESCRIPTION OF THE PREFERRED EMBODIMENTS

FIGS. 3 to 7 show one preferred embodiment of the present invention, as applied to a handle assembly for a tailgate of an automobile of a pickup type.

Figure 3:
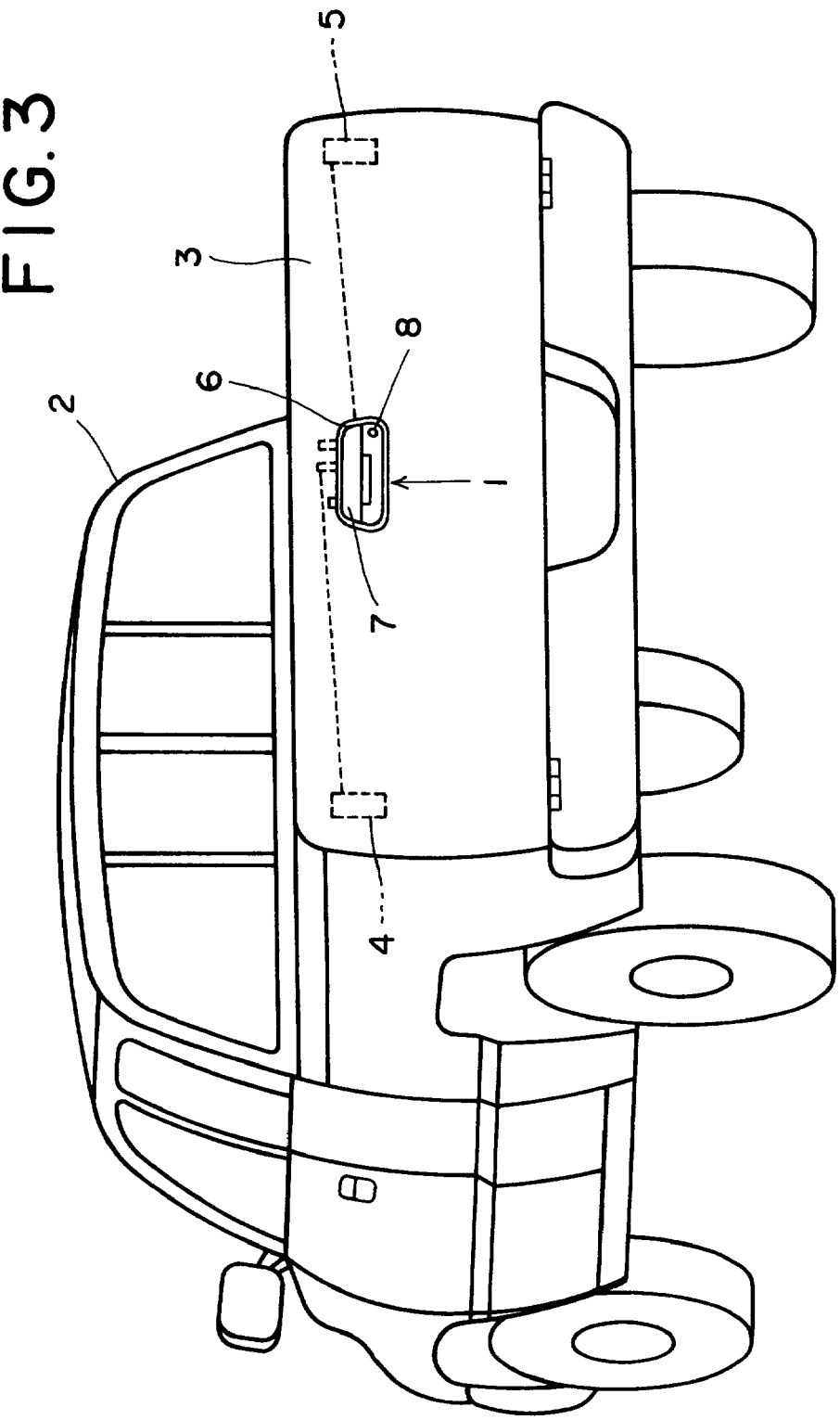
FIG. 3 is a perspective view showing a handle assembly of the present invention attached to a tailgate of an automobile of a pickup type.

In FIG. 3, the handle assembly 1 is attached to an approximate center of the tailgate 3 in its transverse direction in the automobile 2 of a pickup type. At the left and right sides of the tailgate 3, latch units 4, 5 for shutting the tailgate 3 are provided. The latch units each have a well-known latch and ratchet mechanism (not shown).

Figure 4:
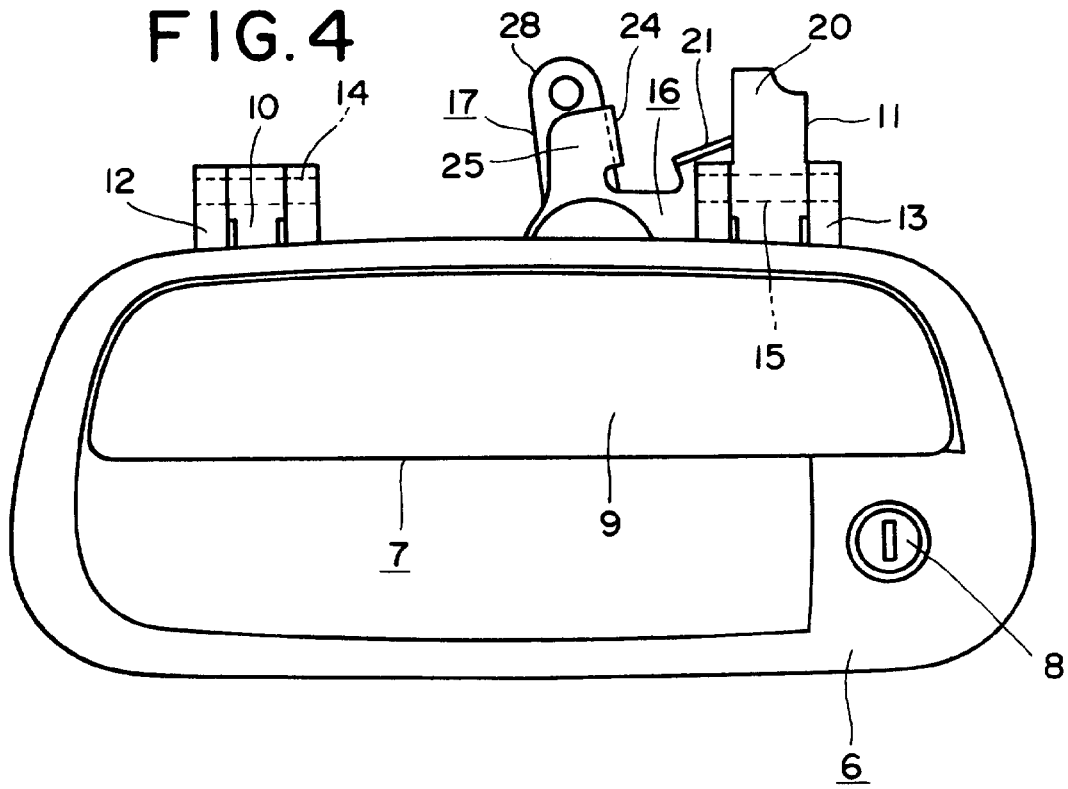
FIG. 4 a front view of the handle assembly.

As shown in FIG. 4, the handle assembly 1 has a handle base 6 which is manufactured by resin and corresponds to the resin part D in the conventional arrangement, a handle lever 7 which is attached to the handle base 6, and a key cylinder 8. The handle lever 7 has a handle portion 9 located on a front side of the handle base 6 and also has a pair of leg portions 10, 11 projected toward a rear side of the handle base 6. The leg portions 10, 11 are rotatably attached respectively by pins 14, 15 to a pair of supporting portions 12, 13 formed integrally with an upper portion of the rear face of the handle base 6.

Figure 5:
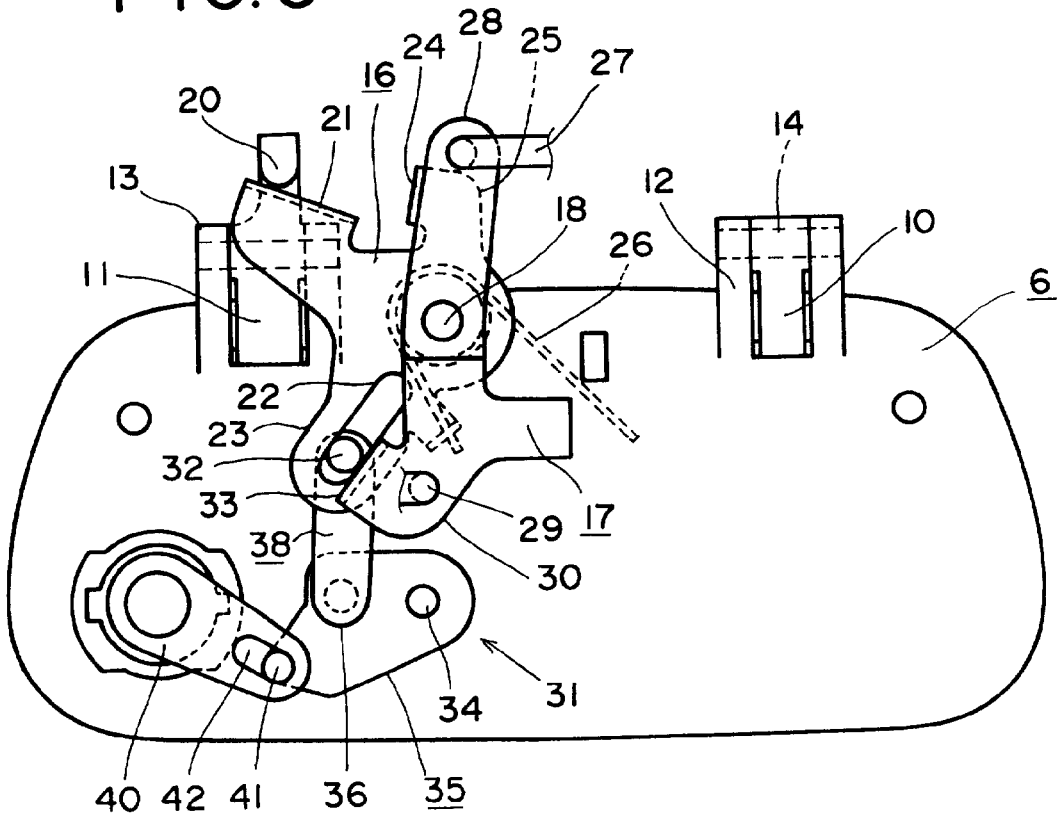
FIG. 5 a rear view of the handle assembly.
Figure 6:
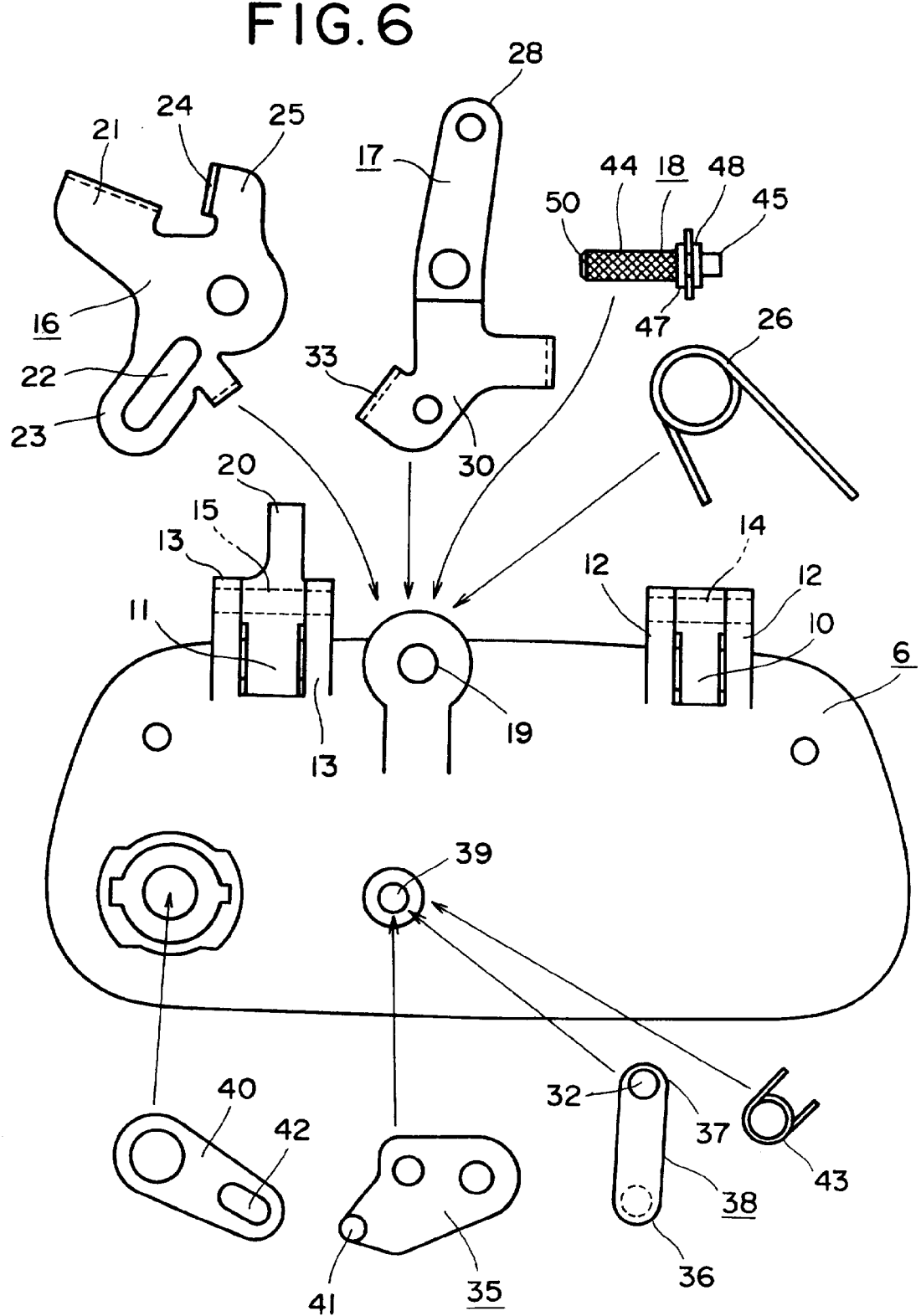
FIG. 6 is an exploded rear view of the handle assembly.
Figure 7:
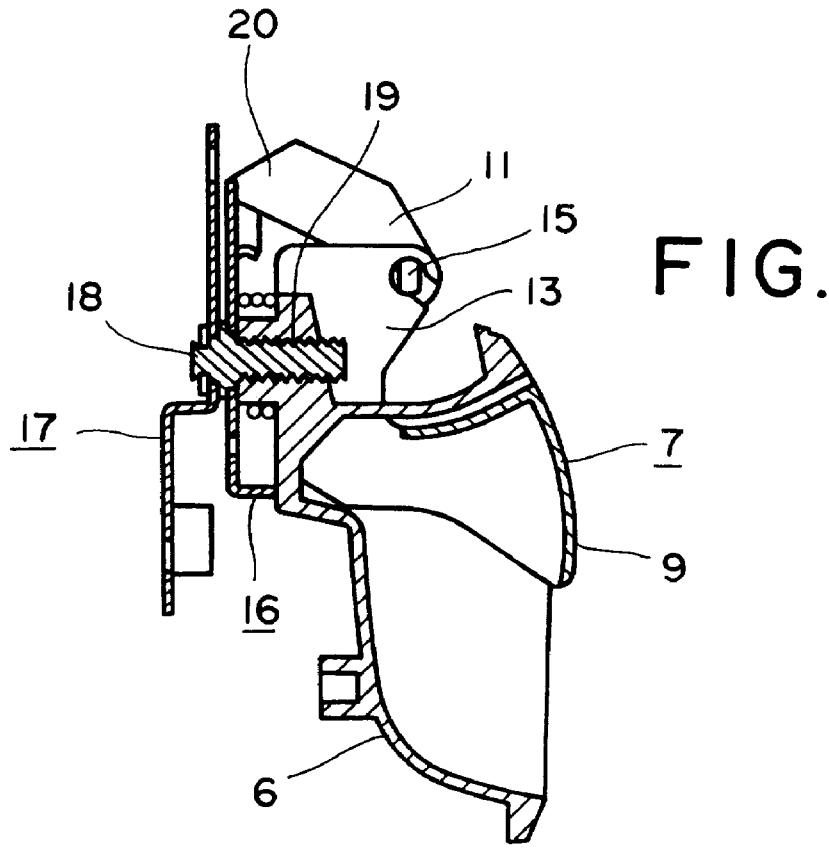
FIG. 7 a cross-sectional view of the handle assembly.

As shown in FIGS. 5 and 6, an open lever 16 and a ratchet lever 17 are supported on the rear face of the handle base 6 by a metallic pin 18 corresponding to the metallic pin A in the conventional arrangement. The metallic pin 18 which is formed in a straight line shape is fixed into an attaching hole 19 formed in the handle base 6 as described later in detail.

The open lever 16 has a first arm 21 which is engageable with an end tip 20 (FIG. 7) of the leg 11 of the handle lever 7, a second arm 23 which has a slot 22 extending in a radius direction of the metallic pin 18, and a third arm 25 which has a bent portion 24. The open lever 16 is biased in a clockwise direction in FIG. 5 by the resilient force of a spring 26 which is arranged in an outer circumference of the metallic pin 18. The first arm 21 always comes into contact with the tip end 20 of the leg portion 11 by the resilient force of the spring 26. When the handle lever 7 is actuated, the tip end 20 of the leg portion 11 pushes the open lever 16 against the resilient force of the spring 26 so that the open lever 16 is rotated counterclockwise.

The ratchet lever 17 has an upper arm 28 connected to the left-hand latch unit 4 of the tailgate 3 through a rod 27 and also has a lower arm 30 connected to the right-hand latch unit 5 through a rod 29.

A lock pin 32 of a locking mechanism 31 is slidably engaged with the slot 22 of the open lever 16. The lock pin 32 is opposed to a bent portion 33 formed in the ratchet lever 17 when the locking mechanism 31 is in an unlocked state shown in FIG. 5. Therefore, when the open lever 16 is rotated counterclockwise by actuating the handle lever 7 in the state of FIG. 5, the lock pin 32 comes into contact with the bent portion 33 and rotates the ratchet lever 17 counterclockwise so as to release the latch units 4, 5 through the rods 27, 29, thereby the tailgate 3 is opened.

The locking mechanism 31 has a lock lever 35 rotatably attached to the handle base 6 by a metallic pin 34 and also has a link 38 having one end 36 pivotally mounted to the lock lever 35 and the other end 37 provided with the lock pin 32. The metallic pin 34 is fixed to an attaching hole 39 formed in the handle base 6 by a method similar to that of the metallic pin 18 described later.

A cylinder lever 40 is fixed to an end portion of the key cylinder 8 and has a slot 42 with which a pin 41 of the lock lever 35 is slidably engaged. When the lock lever 35 is rotated by the key cylinder 8 in the clockwise direction in FIG. 5, the lock pin 32 is slid toward the metallic pin 18 and is separated from the bent portion 33 of the ratchet lever 17, thereby the locking mechanism 31 is switched into a locked state from the unlocked state. In the locked state, the ratchet lever 17 cannot be rotated even when the open lever 16 is rotated in the counterclockwise direction by actuating the handle lever 7. The lock lever 35 is held in one of the locked state and the unlock state by the resilient force of a spring 43.

Only connection of rods 27, 29 is required in the handle assembly 1 having the above-mentioned construction in the present invention after the handle assembly 1 is attached to the tailgate 3. Accordingly, the handle assembly 1 is simply set up.

A structure of the metallic pin 18 and the attaching hole 19 of the handle base 6 will next be explained further in detail.

Figure 8:
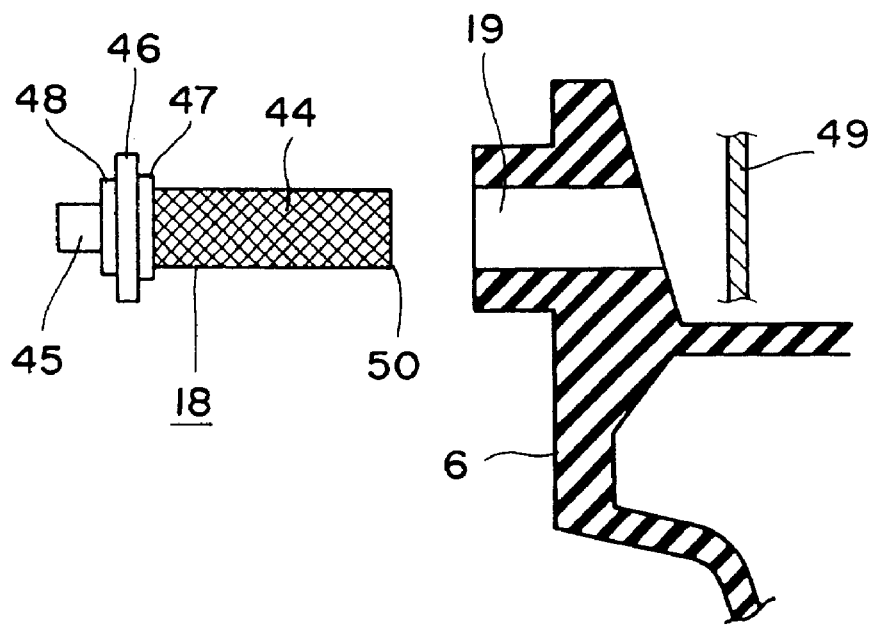
FIG. 8 is an enlargedly partially sectional view of a handle base a metallic pin of the handle assembly.
Figure 9:
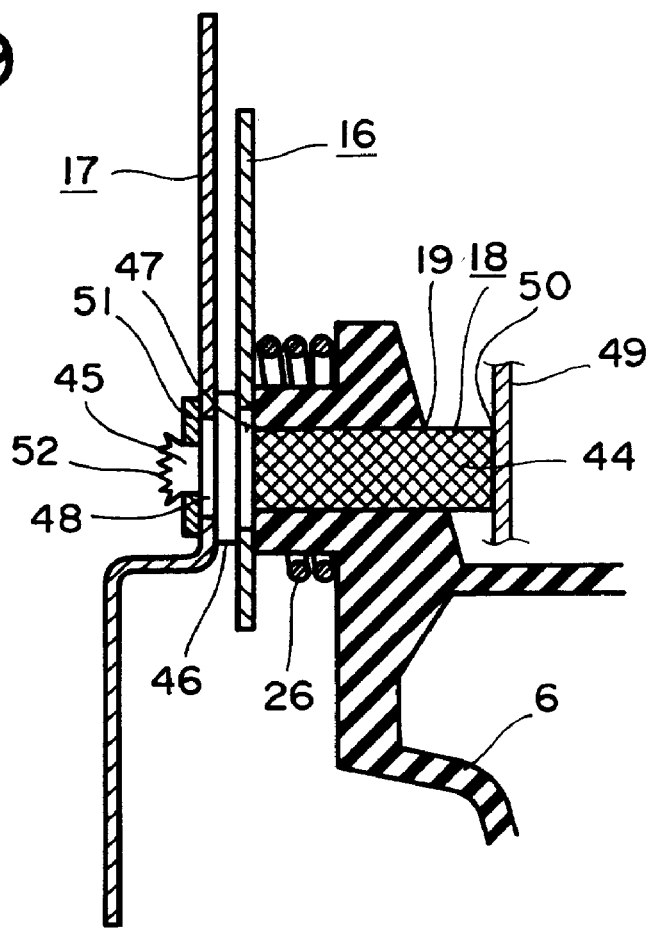
FIG. 9 is a cross-sectional view showing a state in which an open lever and a ratchet lever are attached to the metallic pin fixed to handle base.

In FIGS. 8 and 9, the attaching hole 19 is formed such that the attaching hole 19 extends through the handle base 6. The entire diameter of the attaching hole 19 is an equal in the handle base 6. The metallic pin 18 has an anchor 44 which is adapted to be inserted into the attaching hole 19 and also has a projection 45 formed on a side opposed to the anchor 44. An outer circumference of the anchor 44 is preferably knurled. The anchor 44 is formed such that a diameter of the anchor 44 is slightly greater than that of the attaching hole 19, and a length of the anchor 44 is longer than that of the attaching hole 19.

Figure 1:
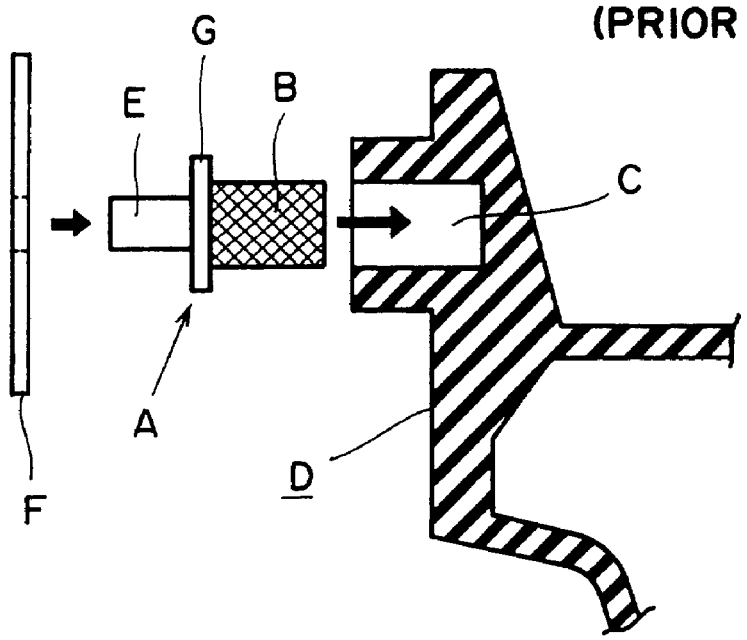
FIGS. 1 and 2 are cross-sectional views showing a conventional arrangement for mounting a metallic pin into a resin part.
Figure 2:
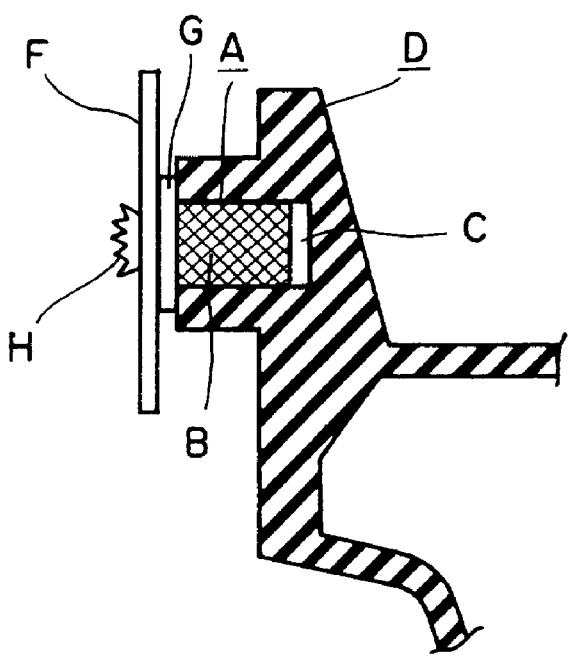

A flange 46 is arranged between the anchor 44 and the projection 45. However, there is a case in which no flange 46 is required in accordance with the number of levers or plates, etc. attached to the metallic pin 18. Namely, with respect to the conventional metallic pin A shown in FIGS. 1 and 2, the anchor B is inserted into the recess C until the flange G comes into contact with the resin part D. However, no flange 46 in the present invention comes into contact with the handle base 46 to determine an inserting position of the anchor 44. The flange 46 is formed to effectively support a lever or plate.

Supporting portions 47, 48 for supporting the lever or plate are formed on both sides of the flange 46. The number of these supporting portions is changed by the number of levers, etc. attached to the metallic pin 18. In the embodiment shown in FIG. 9, to the supporting portion 47 is attached the open lever 16, and to the supporting portion 48 is attached the ratchet lever 17. The supporting portion 47 shown in FIG. 9 has a diameter larger than that of the anchor 44, but can be formed such that the supporting portion 47 has the same diameter as the anchor 44.

The open lever 16 is fitted into a peripheral portion of the supporting portion 47 before the anchor 44 is inserted into the attaching hole 19. The anchor 44 is inserted into the attaching hole 19 of the handle base 6 placed on a base seat 49 until a tip end 50 of the anchor 44 comes into contact with the base seat 49 while the anchor 44 is heated by using a supersonic means, etc. At this time, no anchor 44 is returned since no air of the attaching hole 19 is naturally compressed. Further, the anchor 44 is attached or inserted into the attaching hole 19 at the same depth at any time by the contact of the tip end 50 and the base seat 49. After the insertion of the anchor 44, the ratchet lever 17 is fitted to the supporting portion 48 and a washer 51 is attached to the projection 45 if desired. Thereafter, a head 52 is formed at a tip end of the projection 45 by caulk processing, etc. At this time, the head 52 is easily formed since external force in the formation of the head 52 is absorbed by the base seat 49.

Figure 10:
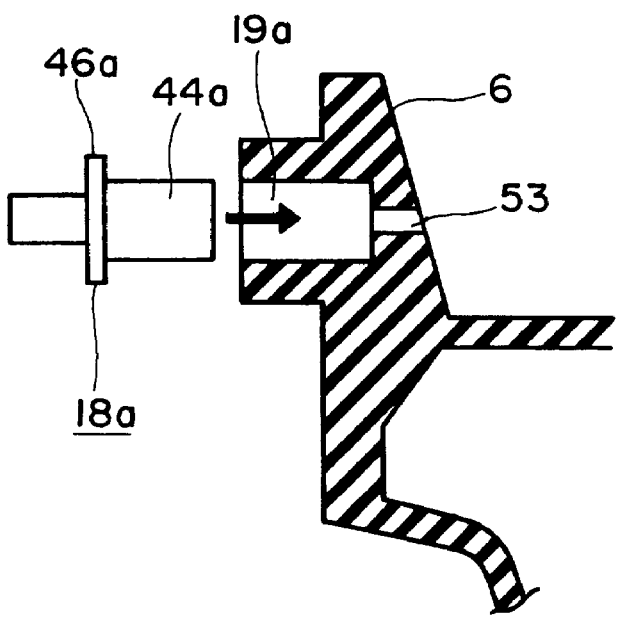
FIG. 10 a cross-sectional view showing a metallic pin and an attaching hole in accordance with a second embodiment of the present invention.

FIG. 10 shows a second embodiment of the metallic pin and the attaching hole. In the second embodiment, a bottom portion of an attaching hole 19a is communicated with an opposite side of the handle base 6 by a small-diameter connecting passage 53, and an anchor 44a of a metallic pin 18a is set to be shorter than the attaching hole 19a. Similar to the first embodiment, the anchor 44a is heated and inserted into the attaching hole 19a. At this time, the air within the attaching hole 19a is externally pushed out through the connecting passage 53 when the anchor 44a is inserted into the attaching hole 19a. Therefore, there is no case in which the anchor is pushed back by the compressed air as in the conventional case. Different from the first embodiment shown in FIG. 9, a flange 46a of the metallic pin 18a comes into contact with the handle base 6 to determine an inserting position of the anchor 44a in the second embodiment. Accordingly, the accuracy of an inserting position of the metallic pin in the second embodiment is slightly inferior to that in the first embodiment. The second embodiment is applied when no anchor 44a can be formed at a long length and no base seat can be arranged on an opposite side of the attaching hole 19a.

What is claimed is:

1. A mounting apparatus comprising:

a resin part having a first surface, a second surface opposite to the first surface, and an attaching hole, said attaching hole having an inlet portion opened to an outside of the resin part at the first surface; and a metallic pin formed in a straight line shape, said metallic pin having an anchor at one side thereof which is adapted to be inserted into the attaching hole through the inlet portion while the anchor is heated, an exposure portion at the other side thereof, and a flange formed between the anchor and the exposure portion;

said anchor having a diameter slightly larger than that of the attaching hole, and having a length shorter than that of the attaching hole;

said flange having a diameter larger than that of the attaching hole so that said flange is brought into contact with the first surface when the anchor is inserted into the attaching hole;

wherein said resin part has a passage which has one end communicated with a bottom portion of the attaching hole and the other end opened to the outside of the resin part at the second surface, and said passage has a diameter smaller than that of the attaching hole.

2. The mounting apparatus according to claim 1, wherein said attaching hole and said passage are arranged in a straight line shape.

3. The mounting apparatus according to claim 1, further comprising a lever or a plate adapted to be attached to the exposure portion of the metallic pin.

4. A mounting apparatus comprising:

a resin part having a first surface, a second surface opposite to the first surface and an attaching hole, said attaching hole,having an inlet portion opened to an outside of the resin part at the first surface and an outlet portion opened to the outside of the resin part at the second surface;

a metallic pin formed in a straight line shape, said metallic pin having an anchor at one side thereof which is adapted to be inserted into the attaching hole through the inlet portion while the anchor is heated and an exposure portion at the other side thereof, said anchor having a length longer than that of the attaching hole, and a tip end of the anchor penetrating the resin part through the attaching hole when inserted; and said attaching hole having a diameter slightly smaller than that of the anchor; and base seat means located outside of the resin part and at the second surface side for setting an insertion length of the anchor by making a contact with the tip end of the anchor when the anchor is inserted into the attaching hole.

5. The mounting apparatus according to claim 4, wherein said base seat means has a flat surface perpendicular to an axis of the anchor for receiving the tip end of the anchor.

6. The mounting apparatus according to claim 5, wherein said exposure portion has a first supporting portion continued with the anchor, a second supporting portion, a flange located between the first and second supporting portions, and a projection continued with the second supporting portion; wherein a first lever is rotatably fitted on the first supporting portion and a second lever is rotatably fitted on the second supporting portion.

7. The mounting apparatus according to claim 6, wherein said base seat means supports the resin part.

8. The mounting apparatus according to claim 6, wherein said base seat means supports and receives external force for forming a head at an end portion of the projection.

9. A pickup type automobile having a tailgate, a latch unit mounted to the tailgate, and a handle assembly attached to the tailgate, wherein said handle assembly comprises;

a handle base made of a synthetic resin and fixed to the tailgate;

a handle lever rotatably attached to the handle base and having a handle portion located on a front side of the handle base and a leg portion projecting toward a rear side of the handle base;

an open lever rotatably attached to the rear side of the handle base and rotated by actuating the handle lever;

a ratchet lever rotatable attached to the rear side of the handle base and connected to the latch unit through a rod so as to release the latch unit when rotated;

a locking mechanism arranged on the rear side of the handle base and displaceable between an unlocked state where rotation of the open lever can be transmitted to the ratchet lever and a locked state where the rotation of the open lever cannot be transmitted to the ratchet lever;

an attaching hole formed in the handle base, said attaching hole having a first opening which is opened to an outside of the handle base at the front side of the handle base and a second opening which is opened to the outside of the handle base at the rear side of the handle base;

a metallic pin formed in a straight line shape, said metallic pin having an anchor inserted into the attaching hole through the second opening while the anchor is heated and an exposure portion arranged on a side opposed to the anchor;

said exposure portion having a flange and supporting portions located on both sides of the flange;

said open lever being rotatably fitted on one of the supporting portions;

said ratchet lever being rotatable fitted on the other of the supporting portions;

said attaching hole having a diameter slightly smaller than that of the anchor; and base seat means located at the front side of the handle base for setting an insertion length of the anchor by making a contact with the tip end of the anchor when the anchor is inserted into the attaching hole.

10. The pickup type automobile according to claim 9, wherein the handle assembly further comprises, a sleeve-shaped portion formed integrally with the handle base, and a key cylinder attached to the sleeve-shaped portion; and said locking mechanism is switched by the key cylinder between an unlocked state and the locked state in which the rotation of the open lever is not transmitted to the ratchet lever.

* * * * *